April 7, 1959 K. SCHLESINGER 2,881,249

TELEVISION RECEIVER

Filed June 1, 1954 2 Sheets-Sheet 1

INVENTOR.
Kurt Schlesinger
BY
Mueller & Aichele
Attys.

April 7, 1959 K. SCHLESINGER 2,881,249
TELEVISION RECEIVER
Filed June 1, 1954 2 Sheets-Sheet 2

INVENTOR.
Kurt Schlesinger
BY Mueller & Aichele
Attys.

United States Patent Office 2,881,249

Patented Apr. 7, 1959

2,881,249

TELEVISION RECEIVER

Kurt Schlesinger, Maywood, Ill., assignor to Motorola, Inc., Chicago, Ill., a corporation of Illinois Application June 1, 1954, Serial No. 433,379

2 Claims. (Cl. 178—7.5)

This invention relates to television receivers, and more particularly to an improved and simplified control circuit for use in a television receiver for effecting synchronization between a sweep system in the receiver and an incoming television signal.

It is usual practice in present day television receivers to provide an automatic frequency control circuit using the phase detector principle for synchronizing the line sweep system of the receiver with the line synchronizing components of incoming television signals. Such a control circuit compares the phase of the periodic scanning signal produced by the line sweep system with the line synchronizing pulses produced by the synchronizing signal separator of the receiver to produce a control potential for synchronizing the sweep system.

Control circuits of the above types are relatively immune to noise disturbances, and synchronism is not entirely destroyed even during intervals when the synchronizing components become lost in background noise. These features are realized since the control exerted by the control circuit on the sweep system depends upon the repetition of many regularly occurring pulses, and a single or random bursts of energy have little effect thereon. These circuits are generally well-known to the art and usually comprise a pair of diodes connected so that a balanced condition exists to provide a minimum response to random noise bursts. Furthermore, such circuits are usually constructed to maintain the control potential at a selected reference value in the absence of synchronizing pulses so that the control circuit does not tend to shift the sweep system from the synchronous frequency during intervals when this condition occurs. It has been found, however, that circuits incorporating a pair of diodes are relatively complicated and expensive, and many attempts have been made to devise simpler control circuits utilizing but a single triode rather than a pair of diodes.

Triode automatic frequency control circuits for line synchronization have been successfully constructed, and such circuits have proved to be less complicated and expensive than the above-mentioned dual diode circuit. However, for the most part, these prior art triode circuits are predicated on similar operating principles to those of the diode circuits, and are still relatively complicated and expensive. The control circuit of the present invention utilizes a simple triode circuit which is predicated upon inherently simple operating principles dissimilar from prior art double diode circuits or their equivalent triode circuits.

It is, accordingly, an object of the present invention to provide an improved triode type control circuit for use in a television receiver to synchronize a sweep system therein with a received television signal, which circuit is highly immune to noise disturbances and which may be constructed simply, inexpensively, and expeditiously.

A more general object of the invention is to provide a new, improved and simplified synchronization control circuit for use in a television receiver.

A feature of the invention is the provision of an improved single triode circuit for synchronizing a sweep system of a television receiver with an incoming television signal, which circuit compares the periodic scanning signal produced by the sweep system with incoming synchronizing pulses, and which circuit uses the synchronizing pulses to clamp the periodic signal at a direct current level having a value related to the phase relation between the pulses and the periodic scanning signal, and which includes means for deriving a control potential corresponding to the direct current level established by the clamping action.

Another feature of the invention is the provision of such a circuit in which the control potential varies on either side of a substantially zero axis with respect to ground for shifts in phase between the synchronizing pulses and the periodic scanning signal for convenient control of the sweep system.

A still further feature of the invention is the provision of such an improved circuit which is constructed to maintain the control potential substantially at zero in the absence of the synchronizing pulses, so that there is no tendency for the sweep system to be shifted thereby from its synchronous frequency under these conditions.

The above and other features of the invention which are believed to be new are set forth with particularity in the appended claims. The invention itself, however, together with further objects and advantages thereof may best be understood by reference to the following description when taken in conjunction with the accompanying drawings in which:

The invention provides a television receiver for utilizing a television signal which includes video frequency components and synchronizing components. The receiver comprises a synchronizing signal separator for producing a series of pulses corresponding to the synchronizing components, and a sweep system for producing a periodic scanning signal. Circuit means are provided for deriving from the sweep system an alternating-current signal having a frequency corresponding to the periodic scanning signal and having a sloping wave-form in each cycle thereof, and a discharge device is provided for clamping the alternating-current signal at a reference potential when the device is in a conductive condition. Further circuit means couples the separator to the discharge device for impressing the pulses from the separator on the device so as to render the device conductive only for the duration of each of the pulses. This causes the discharge device to clamp the alternating current signal at a point on the sloping wave-form of each cycle thereof to the reference potential, with the point in each cycle being established by the phase relation of the pulses and the alternating-current signal and with the average of the clamped alternating-current signal thereby having a value with respect to the reference potential determined by such phase relation.

Finally, means is provided for deriving a control potential corresponding to the average value of the clamped alternating current signal and for impressing the control potential on the sweep system to control the frequency of the periodic scanning signal.

Figure 1:
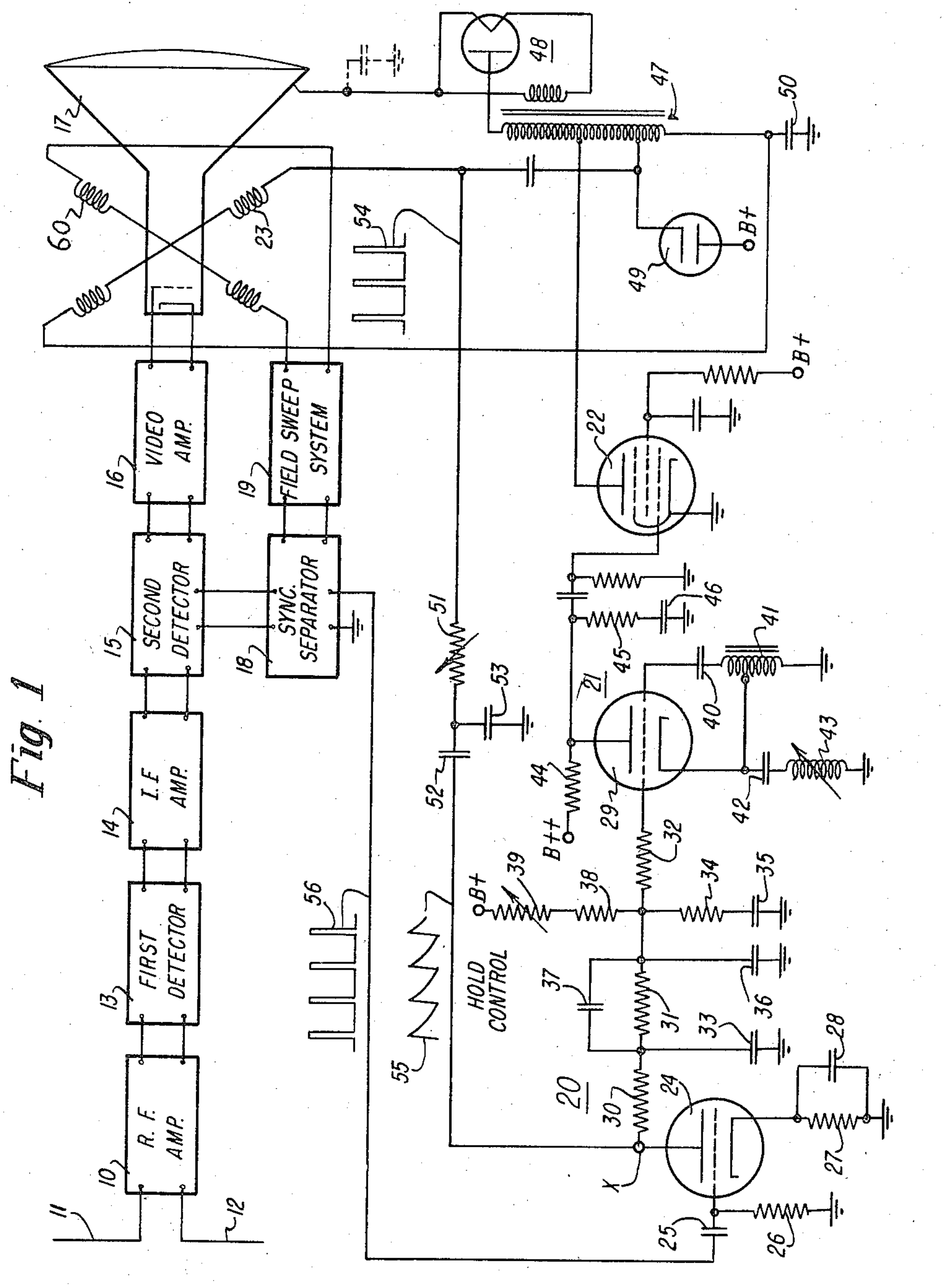
Fig. 1 shows a television receiver incorporating the present invention.

The television receiver of Fig. 1 includes a radio frequency amplifier 10 of any desired number of stages having input terminals connected to a usual antenna circuit 11, 12 and having output terminals connected to a first detector or frequency converter 13. The receiver also includes the usual intermediate frequency amplifier 14, second detector 15, video amplifier 16 and cathode ray image reproducer 17.

Second detector 15 is connected to a synchronizing signal separator 18, and the latter unit has output terminals connected to a field sweep system 19 which, in turn, is coupled to the field deflection elements 60 of reproducing device 17. Separator 18 is also coupled to a line sweep system 21 through an automatic frequency control circuit constructed in accordance with the invention and designated generally as 20. The line sweep system includes an output amplifier stage including device 22, and the sweep system is coupled through this amplifier to the line deflection elements 23 of device 17.

The sound portion of the television receiver forms no part of the present invention and, for that reason, has not been shown.

Separator 18 produces a series of positive-going pulses corresponding to the line synchronizing components of a received television signal, and these pulses are applied to control circuit 20 in which they are compared with a sawtooth signal derived in a manner to be explained and having a frequency corresponding to the periodic scanning signal supplied to line deflection elements 23 by the line sweep system. This comparison produces a control potential that synchronizes the frequency of the periodic scanning signal with the line synchronizing components of the received television signal.

Control circuit 20 includes an electron discharge device 24 having a cathode, a control electrode, and an anode. Separator 18 is coupled to the control electrode through a resistance-capacity biasing network which includes a series capacitor 25 and a resistor 26, the resistor being connected between the control electrode and a point of reference potential or ground. The cathode is connected to the point of reference potential through a biasing network including a resistor 27 shunted by a capacitor 28. The anode is coupled to the control electrode of an electron discharge device 29 through a series of resistors 30, 31 and 32. The junction of resistors 30 and 31 is coupled to the point of reference potential through a capacitor 33; and the junction of resistors 31 and 32 is connected to the point of reference potential through a resistor 34 and series capacitor 35, the elements 34 and 35 being shunted by a capacitor 36, and resistor 31 being shunted by a capacitor 37. The junction of resistor 31, 32 is connected to the positive terminal B+ of a source of unidirectional potential through a resistor 38 and a variable resistor 39 in series therewith, resistor 39 functioning as a hold control for the line sweep system. The negative terminal of source B+ is connected to the point of reference potential, and the source is by-passed for alternating-current in well-known manner.

Device 29 is connected as a blocking oscillator and its control electrode is coupled to the point of reference potential through a capacitor 40 and series-connected inductance coil 41. The cathode of device 29 is connected to ground through a known series-resonant stabilizing network including a capacitor 42 and series inductance coil 43. The cathode is also connected to an intermediate point of inductance coil 41 to complete the blocking oscillator circuit.

The anode of the blocking oscillator device 29 is connected through a load resistor 44 to the positive terminal B++ of a source of unidirectional potential. The anode is further connected to the point of reference potential through a discharge circuit including a resistor 45 and series capacitor 46, and is coupled to the control electrode of the output amplifier device 22 through a usual coupling circuit.

The anode of device 22 is connected to a tap on an output transformer 47, and the transformer is connected in known manner to the deflection elements 23 of device 17. The circuit of transformer 47 also includes a usual high-voltage rectifier network 48 for applying a unidirectional potential to the accelerating electrode of reproducer 17. A damper diode 49 has its cathode connected to a point on transformer 47 and has it anode connected to the positive terminal B+. One of the connections to the line deflection elements 23 is taken from the cathode of diode 49, the other connection to the line deflection elements being taken from the lower end of the transformer, which end is coupled to ground through boot-strap capacitor 50.

The circuitry of the output amplifier 22 and transformer 47 is well-known to the art, and a detailed description thereof is deemed to be unnecessary. This circuitry is illustrated herein to show an appropriate coupling to the cathode of diode 49 for a network extending to the anode of discharge device 24 in control circuit 20. This latter network includes a series-connected resistor 51 and capacitor 52, with a capacitor 53 coupling the common junction of elements 51, 52 to the point of reference potential.

The blocking oscillator of device 29 oscillates in known manner to develop a peaked sawtooth wave across the discharge circuit 45, 46. The parameters of the blocking oscillator circuit are chosen so that it has a free running frequency that approximates the frequency of the line synchronizing pulses developed by separator 18. The free running frequency is stabilized at the synchronizing frequency by the inclusion of the series-resonant stabilizing circuit 42, 43 in the cathode circuit of device 29 and which is resonant at the line frequency. Therefore, the sawtooth wave developed across discharge circuit 45, 46 has a frequency corresponding to the line synchronizing frequency. This sawtooth wave is amplified in device 22 and applied to transformer 47 to develop a periodic scanning signal in line deflection elements 23. It is known that a series of pulses appears across line deflection elements 23, these pulses occurring during the line retrace intervals and recurring at the frequency of the periodic scanning signal. These pulses are indicated by the wave form 54. The pulses are integrated by an integrating circuit formed by resistor 51 and capacitor 53 to form the sawtooth wave 55, the latter being applied to the anode of device 24 through an alternating-current coupling means provided by capacitor 52. That is, the sawtooth wave 55 comprises an alternating-current signal having, for example, approximately 200 volt A.C. amplitude and having a frequency corresponding to the periodic scanning signal applied to line deflection elements 23 by the line sweep system and having a sloping wave-form in each cycle thereof.

Positive-going pulses 56 are derived from separator 18 corresponding to the line synchronizing components, and these pulses are impressed on the control electrode of device 24 through biasing network 25, 26. The biasing network functions in known manner to establish a negative bias on the control electrode so that device 24 is conductive only for the duration of each of the pulses 56.

Figure 2:
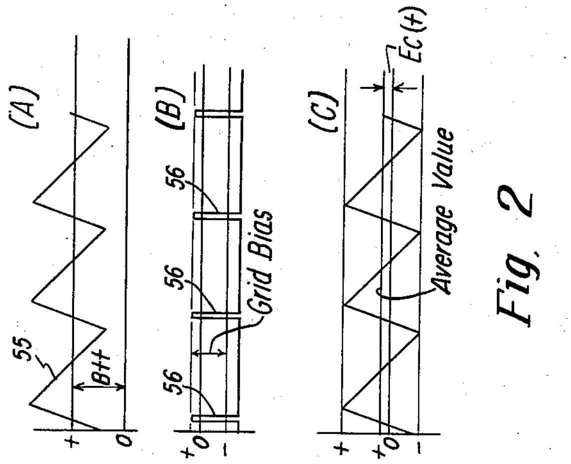

In the condition represented by Fig. 2, the sweep system 21 is assumed to be operating at the synchronous frequency, and the positive-going pulses 56 from the separator 18 (Fig. 2B) occur at the precise moment that each cycle of the sawtooth wave 55 (Fig. 2A) impressed on the anode of device 24 crosses in the positive direction the direct-current axis established by the direct-current connection 30, 31, 38, 39 to the positive terminal B+. Device 24 is conductive for the duration of each of the pulses 56, and its anode potential is reduced to the potential of its cathode for such intervals. That is, a point on the sloping wave-form of each cycle of the sawtooth wave is clamped to cathode potential, with the point being established by the phase relation between pulses 56 and sawtooth wave 55. In the case of Fig. 2, the phase relation is such that this point in each cycle is established at the moment the sawtooth crosses its direct-current axis and when the sawtooth potential itself is zero. Therefore, in Fig. 2, the average value of the sawtooth wave is established at cathode potential. Due to the action of the cathode biasing network 27, 28, the cathode potential and, therefore, the average value of the sawtooth wave is slightly positive with respect to ground potential.

Elements 30, 33 are connected in well-known manner as a filter network for removing the sawtooth wave and elements 31, 34, 35, 36 are connected as an integrator network which derives a control potential ($E_c$) corresponding to the average value of the clamped sawtooth wave. This control potential is impressed on the blocking oscillator of device 29 to control the frequency of the periodic scanning signal. In the case of Fig. 2, the control potential is slightly positive, and the parameters of the system may be so chosen that this potential causes the blocking oscillator to operate at the synchronous frequency.

Figure 3:
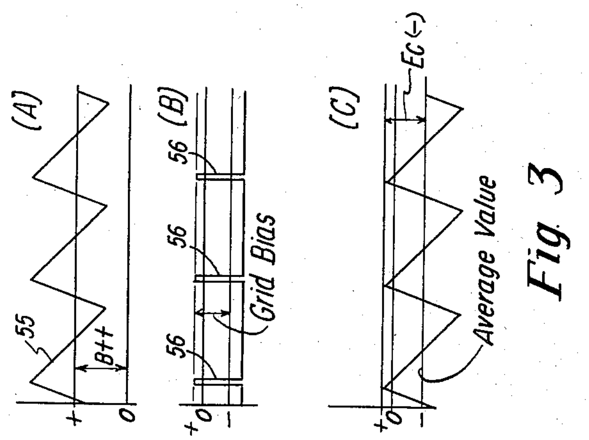

It is assumed in Fig. 3 that the frequency of the blocking oscillator has changed from the synchronous frequency to establish a phase relation between pulses 56 and sawtooth wave 55, so that the pulses occur at the positive peaks of the sawtooth wave (Fig. 3B). In this case, the positive peaks of the sawtooth wave are clamped to the cathode potential so that its average value is established at a negative potential with respect to ground (Fig. 3C).

The integrating means 30—37 derives, therefore, a negative unidirectional control potential ($E_c$) corresponding to the average value of the clamped sawtooth wave, and this potential biases the control electrode of the blocking oscillator device 29 in a negative direction. This produces a frequency reduction in the blocking oscillator so as to re-establish the condition of Fig. 2.

The condition of Fig. 3 represents the maximum change in one direction of the frequency of the blocking oscillator from the synchronous frequency, and the average value of the clamped sawtooth wave has a maximum negative potential for this frequency change. It is evident that for smaller frequency changes in this direction, lower amplitude points on the sloping wave-form of respective cycles of the sawtooth wave will be clamped by device 24 to cathode potential with correspondingly smaller negative average values for the clamped wave. Therefore, for frequency changes of the blocking oscillator in the direction discussed above, the control potential ($E_c$) changes from a slightly positive value to a negative value of sufficient amplitude to restore the synchronous condition.

Figure 4:
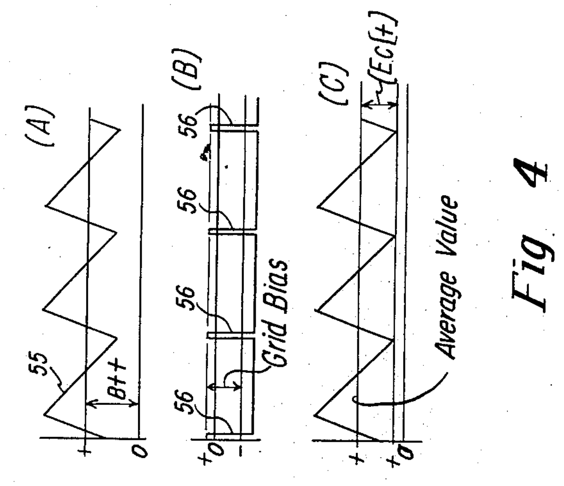
Figs. 2–4 are curves useful in explaining the operation of the invention.

In Fig. 4 it is assumed that the frequency of the blocking oscillator has changed in the opposite direction to that of Fig. 3 so that the pulses 56 occur in time coincidence with the negative peaks of the sawtooth wave (Fig. 4B). In the latter instance, the negative peaks are clamped by device 24 to the cathode potential and the average value of the clamped sawtooth wave is established at a positive potential with respect to ground. The integrating network 30—37 now applies a positive restoring potential to device 29. As in the preceding case, the amplitude of the positive potential increases as the frequency deviation in the positive direction increases.

From the above discussion, it can be seen that any tendency for the frequency of the blocking oscillator to vary from its synchronized value shown in Fig. 2, causes a control potential to be impressed on its control electrode having the proper polarity and amplitude to return the blocking oscillator to the synchronous frequency.

The purpose of the cathode biasing network 27, 28 is to prevent a high negative potential from being impressed on the control electrode of blocking oscillator device 29 during intervals when the synchronizing pulses 56 are lost due to low intensity and high background noise in the received television signal. During such intervals, device 24 functions as a diode, and if it were not for network 27, 28, the resulting conduction of the device would establish its anode at ground potential at the positive peaks of the sawtooth wave 55 so that a high negative potential (corresponding to the condition of Fig. 3) is impressed on the control electrode of device 29. This negative potential has a tendency to pull the blocking oscillator away from its synchronous frequency whenever the synchronous pulses are lost. With the inclusion of network 27, 28, loss of the synchronizing pulses causes the anode 24 to be reduced to a positive potential corresponding to the potential of the cathode at the intervals of the positive peaks of the sawtooth wave, and this positive potential is such that the control potential impressed on the control electrode of device 29 corresponds to the control potential of Fig. 2. Therefore, there is no inclination for the blocking oscillator to be pulled from its synchronous frequency when the synchronizing pulses are lost.

Therefore, cathode resistor 27 is adjusted so that the free-running frequency of the oscillator 29 in the absence of synchronizing pulses approximates the line synchronizing frequency. This also facilitates "pull in" of the system upon the reappearance of the synchronizing components, apart from maintaining the synchronizing frequency in the absence of the components. The resistor 27 has negligible influence on the circuit operation in the presence of the synchronizing components, because device 24 then carries pulsed current. This reduces the average anode current to a small fraction of the maximum pulsed current, thus minimizing cathode bias due to resistor 27 and its shunting capacitor 28.

It is to be noted that random noise bursts have little effect on the circuit, since it requires repeated pulses to have any material effect on the average value of the clamped sawtooth signal, and it is this average value that determines the control effect that is to be exerted on the blocking oscillator. It is also to be noted that the value of the slightly positive control potential ($E_c$) of Fig. 2 can be controlled by controlling the current flow through device 24 during its conductive intervals. This current flow can be controlled by resistor 39, and this resistor is made variable to constitute a convenient hold control for the system.

In a constructed embodiment of the invention, the following circuit parameters were used, and these parameters are listed herein merely by way of example and are not intended to limit the invention in any way:

| | | |
|---|---|---|
| Capacitor **25** | micromicrofarads | 100 |
| Resistor **26** | megohm | 1 |
| Resistor **27** | kilo-ohms | 220 |
| Capacitor **28** | microfarads | .1 |
| Resistor **30** | kilo-ohms | 100 |
| Capacitor **33** | microfarads | .001 |
| Resistor **31** | kilo-ohms | 100 |
| Capacitor **37** | microfarads | .005 |
| Capacitor **36** | do | .01 |
| Resistor **34** | kilo-ohms | 10 |
| Capacitor **35** | microfarads | 0.1 |
| Resistor **32** | kilo-ohms | 56 |
| Resistor **38** | do | 330 |
| Resistor **39** | do | 0–100 |
| Capacitor **52** | microfarads | .01 |
| Capacitor **53** | micromicrofarads | 500 |
| Resistor **51** | kilo-ohms | 100 |
| Resistor **44** | do | 100 |
| Capacitor **42** | micromicrofarads | 500 |
| Inductance coil **43** | millihenries | 150 |
| Capacitor **40** | microfarads | .001 |
| Inductance coil **41** | millihenries | 300 |
| Resistor **45** | kilo-ohms | 4.7 |
| Capacitor **46** | micromicrofarads | 330 |

The constructed embodiment of the invention has been found to operate with a high degree of efficiency, and to be relatively immune to noise and other disturbances.

The invention provides, therefore, a simple and improved control circuit for a television receiver, which adequately controls a sweep system of the receiver and yet which requires a minimum of components and relatively uncomplicated associated circuitry.

While a particular embodiment of the invention has been shown and described, modifications may be made and it is intended in the appended claims to cover all such modifications as fall within the true spirit and scope of the invention.

I claim:

1. A television receiver utilizing a television signal which includes video components and synchronizing components, said receiver including in combination, television signal receiving and translating means and reproducing means utilizing an electron beam for reproducing information represented by the signal, synchronizing signal separator circuit means for producing pulses in response to the synchronizing components, a sweep system including circuit means for producing a periodic scanning signal with sections thereof for scanning and retracing the electron beam in said reproducing means, wave forming circuit means coupled to said sweep system for deriving a sawtooth signal therefrom having a portion with a finite slope representing the retrace section of the scanning signal, signal clamping circuit means for clamping the sawtooth signal to a reference potential and including an electron discharge device having first, second and third electrodes, said clamping circuit means further including an input capacitor coupled between said wave forming circuit means and said third electrode and resistor means coupled to said third electrode and to a source of voltage with respect to the reference point, said clamping circuit means also including means for biasing said first electrode to the reference potential, circuit means for applying the pulses from said synchronizing signal separator circuit means to said second electrode for causing conduction thereof during such pulses so that a point on the retrace section of the sawtooth signal is clamped to the reference potential, said point on the retrace section of the sawtooth signal being established by the phase relation of the sawtooth signal with respect to the pulses, said sweep system including oscillator means for controlling the periodic scanning signal, said oscillator means being adapted to vary the frequency of the scanning signal in response to application of a control potential thereto, circuit means coupled to said resistor means and to said oscillator means and providing filtering of the clamp sawtooth signal appearing at said third electrode for applying to said oscillator means a control potential varying according to the level of the sawtooth signal with respect to the clamp point thereof.

2. A television receiver utilizing a television signal which includes video components and synchronizing components, said receiver including in combination, television signal receiving and translating means and reproducing means utilizing an electron beam for reproducing information represented by the signal, synchronizing signal separator circuit means for producing pulses in response to the synchronizing components, a sweep system including circuit means for producing a periodic scanning signal with sections thereof for scanning and retracing the electron beam in said reproducing means, integrating circuit means coupled to said sweep system for deriving a sawtooth signal therefrom having a portion with a finite slope representing the retrace section of the scanning signal, signal clamping circuit means for clamping the sawtooth signal to a reference potential and including a triode electron discharge device having cathode, grid and anode electrodes, said clamping circuit means further including an input capacitor coupled between said integrating circuit means and said anode electrode and resistor means coupled to said anode electrode and to a source of voltage with respect to the reference point, said clamping circuit means also including cathode bias means for biasing said cathode electrode to the reference potential, circuit means for applying the pulses from said synchronizing signal separator circuit means to said second electrode for causing conduction thereof during such pulses so that a point on the retrace section of the sawtooth signal is clamped to the reference potential, said point on the retrace section of the sawtooth signal being established by the phase relation of the sawtooth signal with respect to the pulses, said sweep system including oscillator means for controlling the periodic scanning signal, said oscillator means being adapted to vary the frequency of the scanning signal in response to application of a direct current control potential thereto, circuit means coupled to said resistor means and to said oscillator means and providing filtering of the clamped sawtooth signal appearing at said anode electrode for applying to said oscillator means a direct current control potential varying according to the average value of the sawtooth signal with respect to the clamped point thereof, and a portion of said resistor means coupled to the source of voltage being adjustable for setting the level of the direct current control potential.

References Cited in the file of this patent

UNITED STATES PATENTS

| | | |
|---|---|---|
| 2,561,817 | Parker | July 24, 1951 |
| 2,645,717 | Massman | July 14, 1953 |
| 2,697,131 | Baroch | Dec. 14, 1954 |
| 2,734,945 | Sonnenfeldt | Feb. 14, 1956 |
| 2,739,182 | Wissel et al. | Mar. 20, 1956 |